United States Patent
Brown, III et al.

(10) Patent No.: US 8,964,773 B2
(45) Date of Patent: *Feb. 24, 2015

(54) METHOD AND SYSTEM FOR ESTABLISHING COOPERATIVE ROUTING IN WIRELESS NETWORKS

(71) Applicant: TrellisWare Technologies, Inc., San Diego, CA (US)

(72) Inventors: Thomas A. Brown, III, Cardiff by the Sea, CA (US); Adam M. Blair, San Diego, CA (US); Mark L. Johnson, Poway, CA (US); Thomas R. Halford, Manhattan Beach, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 13/896,763

(22) Filed: May 17, 2013

(65) Prior Publication Data

US 2014/0161015 A1 Jun. 12, 2014

Related U.S. Application Data

(63) Continuation of application No. 12/101,633, filed on Apr. 11, 2008, now Pat. No. 8,457,005, which is a continuation-in-part of application No. 11/833,113, filed on Aug. 2, 2007, now Pat. No. 8,588,126.

(60) Provisional application No. 60/864,927, filed on Nov. 8, 2006.

(51) Int. Cl.
*H04J 3/26* (2006.01)
*H04J 3/14* (2006.01)
(Continued)

(52) U.S. Cl.
CPC .............. *H04W 40/28* (2013.01); *H04L 45/10* (2013.01); *H04L 45/122* (2013.01);
(Continued)

(58) Field of Classification Search
USPC ......... 370/229, 235, 248–249, 252, 312, 366, 370/389, 390, 392, 428, 432, 471; 709/227–228, 237–239
See application file for complete search history.

(56) References Cited

U.S. PATENT DOCUMENTS

| 4,817,093 A | 3/1989 | Jacobs et al. |
| 5,303,207 A | 4/1994 | Brady et al. |

(Continued)

FOREIGN PATENT DOCUMENTS

| EP | 1185037 A | 3/2002 |
| JP | 53117302 A2 | 10/1978 |

(Continued)

OTHER PUBLICATIONS

Carter et al., "High Throughput, Power and Spectrally Efficient Communications in Dynamic Multipath Environments" IEEE MILCOM 2003, vol. 1, (Oct. 2003), pp. 61-66.

(Continued)

*Primary Examiner* — Redentor Pasia
(74) *Attorney, Agent, or Firm* — Kilpatrick Townsend & Stockton LLP

(57) ABSTRACT

A system and method is presented for establishing relayed communications involving (1) sending a request message from a source node to a destination node through a plurality of intermediate nodes, (2) receiving the request message at the destination node, and (3) sending an acceptance message from the destination node to the source node through at least a subset of the intermediate nodes, wherein an intermediate node relays the request or acceptance message by receiving the message and re-transmitting the message, and wherein the intermediate node is capable of receiving the message from more than one other intermediate node.

20 Claims, 2 Drawing Sheets

(51) Int. Cl.

| | | |
|---|---|---|
| *H04H 20/71* | (2008.01) | |
| *H04L 12/28* | (2006.01) | |
| *G06F 15/16* | (2006.01) | |
| *H04W 40/28* | (2009.01) | |
| *H04L 12/751* | (2013.01) | |
| *H04L 12/733* | (2013.01) | |
| *H04L 12/707* | (2013.01) | |
| *H04W 40/22* | (2009.01) | |
| *H04W 76/02* | (2009.01) | |
| *H04W 84/18* | (2009.01) | |
| *H04B 7/26* | (2006.01) | |
| *H04W 16/26* | (2009.01) | |
| *H04W 88/04* | (2009.01) | |

(52) U.S. Cl.
 CPC ........................ *H04L 45/22* (2013.01);
  *H04L 45/24* (2013.01); *H04W 40/22* (2013.01);
  *H04W 76/022* (2013.01); *H04W 84/18*
  (2013.01); *H04B 7/2606* (2013.01); *H04W*
  *16/26* (2013.01); *H04W 88/04* (2013.01)
 USPC .......... 370/432; 370/235; 370/248; 370/252;
  370/312; 370/392; 709/228

(56) References Cited

U.S. PATENT DOCUMENTS

| | | | |
|---|---|---|---|
| 5,406,586 A | 4/1995 | Wang | |
| 5,650,962 A | 7/1997 | Arase | |
| 5,812,522 A | 9/1998 | Lee et al. | |
| 6,690,657 B1 | 2/2004 | Lau et al. | |
| 6,857,087 B2 | 2/2005 | Crozier et al. | |
| 6,940,832 B2 * | 9/2005 | Saadawi et al. | 370/328 |
| 7,092,457 B1 | 8/2006 | Chugg et al. | |
| 7,127,659 B2 | 10/2006 | Richardson et al. | |
| 7,200,184 B2 | 4/2007 | Schulz et al. | |
| 7,280,481 B2 * | 10/2007 | Rong | 370/238 |
| 7,346,041 B2 | 3/2008 | Eklund et al. | |
| 7,672,277 B2 | 3/2010 | Qiao | |
| 7,986,748 B2 | 7/2011 | Akkarakaran et al. | |
| 8,457,005 B2 | 6/2013 | Brown, III et al. | |
| 2001/0014089 A1 | 8/2001 | Okajima et al. | |
| 2002/0136318 A1 | 9/2002 | Gorokhov et al. | |
| 2002/0197998 A1 | 12/2002 | Schmidt | |
| 2003/0063585 A1 | 4/2003 | Younis et al. | |
| 2003/0204616 A1 | 10/2003 | Billhartz et al. | |
| 2004/0022224 A1 | 2/2004 | Billhartz | |
| 2004/0096213 A1 | 5/2004 | Perkins et al. | |
| 2004/0160943 A1 | 8/2004 | Cain | |
| 2004/0230638 A1 | 11/2004 | Balachandran et al. | |
| 2005/0030921 A1 | 2/2005 | Yau | |
| 2005/0041627 A1 * | 2/2005 | Duggi | 370/338 |
| 2005/0099983 A1 * | 5/2005 | Nakamura et al. | 370/338 |
| 2006/0153496 A1 | 7/2006 | Tanobe et al. | |
| 2006/0182126 A1 * | 8/2006 | Yuen et al. | 370/400 |
| 2008/0107044 A1 | 5/2008 | Blair | |
| 2008/0198789 A1 | 8/2008 | Brown et al. | |
| 2009/0313528 A1 | 12/2009 | Chugg et al. | |

FOREIGN PATENT DOCUMENTS

| | | |
|---|---|---|
| JP | 2002152092 A2 | 5/2002 |
| JP | 2005538608 A | 12/2005 |
| JP | 2005538614 A | 12/2005 |
| JP | 20072018448 A2 | 8/2007 |
| WO | 03/015452 A | 2/2003 |
| WO | 2004/023665 A2 | 3/2004 |
| WO | 2004/023666 A1 | 3/2004 |
| WO | 2005/064872 A1 | 7/2005 |
| WO | 2007/125514 A | 8/2007 |
| WO | 2008/058213 A2 | 5/2008 |

OTHER PUBLICATIONS

Lee et al., "A Pragmatic Approach to Cooperative Communication," Proc. IEEE Military Comm., Washington, DC. (Oct. 2006), 7 pages.
Lee et al., "A Pragmatic Approach to Cooperative Diversity Communication" Abstract; printed on Sep. 2, 2010 from htt://www.milcom.org/2006/abstracts/1266.html; 1 page.
Lee et al., "A New Taxonomy of Routing Algorithms for Wireless Mobile Ad Hoc Networks: The Component Approach," IEEE Communications Magazine, Nov. 2006. vol. 46, pp. 116-123.
Ni et al., "The Broadcast Storm Problem in a Mobile Ad Hoc Network," MobiCom, Seattle, WA. (1999), pp. 151-162.
Ramanathan, "Challenges: A Radically New Architecture for Next Generation Mobile Ad Hoc Networks;" Proceedings of the 11th Annual International Conference on Mobile Computing and Networking Mobicom, Cologne, Germany, (2005), pp. 132-139.
International Search Report and Written Opinion for PCT Application No. PCT/US2007/083985, mailed May 2, 2008, 15 pages.
European Search Report for EP Patent Application No. 08253559, mailed Mar. 19, 2009; 8 pages.
Final Office Action for U.S. Appl. No. 12/101,633, mailed Oct. 18, 2011; 25 pages.
Non-Final Office Action for U.S. Appl. No. 12/101,633, mailed Apr. 15, 2011, 54 pages.
Final Office Action for U.S. Appl. No. 11/833,113, mailed Jan. 4, 2010; 22 pages.
Non-Final Office Action for U.S. Appl. No. 11/833,133, mailed Jun. 22, 2009, 24 pages.
Non-Final Office Action of Aug. 27, 2012 for U.S. Appl. No. 11/833,113, 24 pages.
Non-Final Office Action of Sep. 14, 2012 for U.S. Appl. No. 12/101,633, 24 pages.
Non-Final Office Action for U.S. Appl. No. 12/245,993, mailed on Jan. 31, 2012; 20 pages.
Final Office Action for U.S. Appl. No. 12/245,993, mailed Jun. 8, 2012, 21 pages.
Final Office Action of Jan. 31, 2013 for U.S. Appl. No. 11/833,113, 23 pages.
Notice of Allowance of Feb. 5, 2013 for U.S. Appl. No. 12/101,633.
Non-Final Office Action of Jul. 22, 2013 for U.S. Appl. No. 12/245,993, 24 pages.
Notice of Allowance of Jul. 2, 2013 for U.S. Appl. No. 11/833,113, 8 pages.
Notice of Allowance of Oct. 1, 2014 for U.S. Appl. No. 14/035,444, 13 pages.

* cited by examiner

METHOD AND SYSTEM FOR ESTABLISHING COOPERATIVE ROUTING IN WIRELESS NETWORKS

This application is a continuation of U.S. patent application Ser. No. 12/101,633, filed Apr. 11, 2008, titled "Method and System for Establishing Cooperative Routing in Wireless Networks"; which is a continuation-in-part of U.S. patent application Ser. No. 11/833,113, filed Aug. 2, 2007, titled "Methods and Apparatus for Network Communication Via Barrage Relay Onto an Independent Medium Allocation"; which is a nonprovisional application claiming priority to U.S. Provisional Application No. 60/864,927, filed Nov. 8, 2006, titled "Information Relating to Orthogonal Dimension Barrage Relay", the disclosures of which are hereby incorporated by reference in their entirety.

BACKGROUND OF THE INVENTION

The present disclosure relates to a system and method capable of establishing efficient, robust, multi-hop cooperative routes in communication networks. The techniques disclosed are well-suited for conveying voice, streaming video and other delay-sensitive applications and more specifically in wireless ad hoc networks, by exploiting the concept of barrage relay, thus bypassing the need for carrier sensing and collision avoidance for multiple-access purposes or the creation and use of connectivity tables at each node for routing purposes. In at least one embodiment, these techniques may be used to form a novel, unicast, reactive route-establishment protocol in mobile ad-hoc networks ("MANETs").

The theory and practice of MANETs has witnessed great interest recently, spurred by applications in the tactical-radio space and related commercial endeavors. However, the development of effective and scalable solutions that satisfy rapid-relaying and routing requirements for streaming and other delay-sensitive, QoS-demanding applications in MANETs has lagged behind, primarily due to the harsh terrestrial propagation, uncertain network topology from node mobility and unreliable links, total lack of infrastructure, large number of hops required for end-to-end connectivity, and so on.

Designed-based problems associated with known MANET techniques include the deficiency in channel accessing and route establishment brought about by the use of classic protocols originally destined for wireless LAN's or cellular networks of the 2nd and 3rd Generation, protocols that simply don't lend themselves to use in the current environment because of their emphasis on process re-initiation at every hop (link). This negative situation has led to calls for new architectures and paradigm shifts in network-protocol-stack design for MANETs [R. Ramanathan, "Challenges: A Radically New Architecture for Next Generation Mobile Ad Hoc Networks," Proc. ACM/IEEE Int'l Conf. Mobile Comp. and Networking, Cologne, Germany, August 2005, pp. 132-139]. The present disclosure can be viewed as a practical way to affect such a quantum step in designing, implementing, testing and deploying processes and protocols that are particularly well-suited to MANET's and outperform classic solutions by orders of magnitude in latency, throughput, scalability and the like.

As a first step in alleviating these problems and revisiting the MANET networking problem ab initio, U.S. patent application Ser. No. 11/833,113 (discussed above) introduced the concept of barrage relay as a way for multiple network nodes to access the various wireless links in a manner that is delay-efficient, enhances the Signal-to-Noise (SNR) of each packet reception per node and circumvents the problem of packet collisions inherent in classic multiple-access schemes. The techniques of barrage relay are adopted as an underlying mechanism for the current proposition of robust collective route establishment. Thus, the present disclosure results in a substantial modification of the heretofore known, classic PHY transmission/reception mechanisms by exploiting the straightforward and efficient form of autonomously decided, decentralized, minimum-latency transmission schemes and associated diversity-combining reception schemes collectively known as "barrage relay". It is noted that the "barrage-relay" concept of U.S. patent application Ser. No. 11/833,113 includes and combines the dual notions of "broadcasting by flooding" and of "cooperative diversity" of [S-Y Ni, Y-C Tseng, Y-S Chen and J-P Sheu, "The Broadcast Storm Problem in a Mobile Ad Hoc Network," MobiCom, Seattle, Wash., 1999] and [D. K. Lee and K. M. Chugg, "Pragmatic Cooperative Diversity Communications," Proc. IEEE Military Comm. Conf., Washington, D.C., October 2006], respectively, along with unique relaying logic performed by each node. The routing protocol proposed herein harnesses these advantages in a unique way so as to set up any desired cooperative route in a fast, robust and efficient way.

Due to this unique PHY-MAC combination, both U.S. patent application Ser. No. 11/833,113 as well as the present disclosure modify in a substantial way the logic behind the known link-access mechanisms such as Carrier-Sense Multiple Access/Collision Avoidance (CSMA/CA) to be found in, for example, the IEEE 802.11 family of standards (Wi-Fi), where nodes take turns in sending a packet and employ carrier sensing in order to avoid collisions. It does so by exploiting the PHY-layer ability to collect energy from multiple simultaneous (or near-simultaneous) identical packets, thus obviating the need for delaying transmissions and taking turns for fear of collisions at the link layer.

In addition, the present disclosure differs in a substantial way from the heretofore known layer-3 routing schemes collectively known as "ad hoc routing protocols" [M. J. Lee, J. Zheng, X. Hu, H. Juan, C. Zhu, Y. Liu, J. S. Yoon, and T. N. Saadawi, "A New Taxonomy for Routing Algorithms for Wireless Mobile Ad Hoc Networks: The Component Approach," IEEE Communications Magazine, vol. 46, pp. 116-123, November 2006] (a classic representative of which is, for instance, the Ad-hoc On-demand Distance Vector—AODV protocol for on-demand routing protocols presented at the MANET working group) by obviating the need to form connectivity tables at each node and thus greatly reducing the concomitant expenditure of network capacity in control signaling for forming and maintaining such.

The present disclosure thus effectively merges the PHY-MAC layer properties of autonomous transmission and cooperative-diversity reception inherent in the barrage-relay concept of U.S. patent application Ser. No. 11/833,113, along with a novel layer-2 routing (collective path-setting) mechanism presented herein, to arrive at an effective, reactive (on-demand), cross-layer optimized method for a joint PHY-MAC-routing protocol creation.

BRIEF SUMMARY OF THE INVENTION

In view of the forgoing background, a mechanism for setting up packet routing (called a "cooperative route" and defined below) between a source node and a destination node in an ad hoc network, via multiple cooperative paths existing and operating simultaneously in time, is presented according to at least one embodiment of the present invention.

As referred to here, a cooperative path is a collection of individual paths (in the graph-theoretic sense) between the source and the destination with relaying nodes arranged in layers or hops, and is uniquely characterized by the collection of relaying nodes which cooperate in the forwarding of each packet as well as the number of induced hops. Two such cooperative paths are called distinct if the two sets of nodes involved in the same layer index (i.e., of the same hop number) for the two cooperative paths under consideration are mutually exclusive. As referred to here, a cooperative route is the collection of all such distinct cooperative paths between a given source and a given destination. The above definitions are made clear in FIG. 1.

FIG. 1 illustrates a cooperative route between a source node (S) and a destination node (D) as a collection of distinct cooperative paths, in accordance with an embodiment of the present invention. Specifically, this figure shows three distinct cooperative paths between S and D, comprising a cooperative route between S and D. The numbers in cycles denote the respective layer index for the relaying nodes in each cooperative path. The upper cooperative path consists of three hops between S and D. The cooperative path below it consists of 4 hops between S and D, as does the bottom cooperative path, whereby cooperation between the two relaying nodes labeled "2" helps relay node numbered "3" receive the signal in either of these two cooperative paths.

According to an embodiment of the invention, the nodes of an ad hoc network under consideration transmit and receive according to techniques such as those disclosed in U.S. patent application Ser. No. 11/833,113 and do not need to form, maintain or update connectivity tables indicating the topology of neighboring nodes, the quality of the links connecting them, etc., as is customary in many other known ad hoc routing protocols. Therefore, each transmitting node is blind with respect to the existence of neighboring nodes or the quality of the intervening channel between itself and all other receiving nodes. Channel-state information is needed and autonomously derived in a cumulative sense at each receiving node; that is, estimation is needed of the total received channel from all transmitting nodes reaching the receiving node under consideration and not for each one channel individually, as described in detail in U.S. patent application Ser. No. 11/833,113. None of the transmitting or receiving nodes in the network needs to form, maintain or update connectivity tables with respect to neighboring nodes, or needs to maintain lists of temporary routes back to the source as, for example, the Ad-hoc On-demand Distance Vector ("AODV") and Dynamic MANET On-demand ("DYMO") routing protocols do.

A cooperative routing protocol is described below in accordance with a specific embodiment of the invention. In this protocol, the source broadcasts a Request-For-Route (RFR) packet, which then propagates throughout the ad hoc network according to a barrage relay as previously described.

This RFR packet includes: the source node's unique ID, the intended destination node's unique ID, a field acting as an RFR hop counter (RFR_hops), indicating the distance of a node from the source measured in hops, and a route "width" parameter which is a non-negative integer N. The purpose of these parameters will be explained below in more detail.

This initial broadcast transmission of the RFR packet by the source node sets the value of the RFR_hops number to one (or any other agreed-upon number). Any other node that receives the RFR packet successfully stores in memory this received RFR relay number, increments the "RFR relay number" field in the packet by one and re-transmits (broadcasts) the packet, as per the principles of the barrage relay as previously described. Note that multiple devices may (and typically will) be sending the same identical packet at approximately the same time and at the same medium allocation.

The destination node, upon reception of the RFR packet intended for it, may or may not relay this packet further.

When the destination node receives this RFR packet correctly (and identifies itself as the destination node), it sends out a Clear-To-Route (CTR) packet which additionally includes the Total RFR Relay Number (as formed up to this destination node) and a CTR relay number (CTR_hops), indicating the distance of a node from the destination measured in hops, which it initially sets to one (or any other agreed-upon number). This initial CTR packet propagates in the ad hoc network according to the barrage-relay principles.

Any intermediate relay node that receives and demodulates/decodes this CTR packet successfully stores in memory this received CTR relay number, recalls the previously stored RFR relay number and performs a logical operation which allows it to assess whether it is on the desired routing path for this particular (source, destination) pair or not. This assessment will, in turn, determine whether this node will participate in relaying any routed packet between these two specific nodes (source and destination) until the packet transport is terminated or a time-out occurs.

If a node has not received either the RFR or the CTR packets it does not participate in the said calculation and the respective route.

This logic operation is controlled by a threshold value which includes the aforementioned route width parameter N. This number N may be set to be common throughout the network or may vary with the {source, destination} pair ID's or even vary with the CTR of individual packets (thus setting up a prioritization mechanism).

If the logic operation discussed above determines that a specific node should be on a collective route for a {path, destination} pair and thus should become a relay node for that route, then the node will increment the "CTR relay number" field in the packet by one and will re-transmit (broadcast) the CTR packet, as per the principles of barrage relay.

If, upon receiving both the RFR and CTR packets, the logic operation discussed above determines that a specific node should not be on a collective route for a {path, destination} pair, then the node will act as a sentry and not relay the CTR packet further. Notice that because the CTR is not further relayed by the sentry nodes, the CTR does not propagate through the network beyond the barrier established by the said sentries.

In a further embodiment of this disclosure, the assignment of the role of "sentry" to additional nodes (beyond those described by the logic operation above) for any particular route is achieved via the transmission by the destination node of an additional packet, called a "sentry" packet, which assigns this role to nodes receiving this packet only and no other packet (RFR or CTR).

In a further embodiment of this disclosure, the destination node waits for a pre-specified number of time slots before transmitting a CTR packet (after receiving the associated RFR packet) in order for potential RFR/CTR packet collisions to be avoided at an intermediate relay node.

In a further embodiment of this disclosure, the original source node waits for another pre-specified number of time slots before it starts actual data transmission on that established collective route.

DETAILED DESCRIPTION OF THE INVENTION

In this section we provide a detailed description of a protocol for establishing buffered unicast routes in a barrage relay network, according a specific embodiment of the present invention. Whenever a source node wishes to establish a (unicast) route to some destination node, this source node broadcasts a RFR packet (packet) that contains a hop counter in barrage-relay fashion, so that every listening (relayed to and possibly relaying) node eventually learns its distance to the source (in hops); no more information is retained by the node for the time being. Upon reception of the RFR packet, the destination broadcasts a CTR packet (packet) that contains a second hop counter, so that every listening node eventually learns its distance to the destination (included in this CTR packet is the source-destination total hop distance). Following this procedure, nodes can ascertain whether they are on some cooperative path between the source and destination nodes. Such nodes then become relays for a subsequent unicast flow. Nodes that are adjacent to the flow—also ascertained from the RFR/CTR packets—become buffers (or sentries) for the flow, effectively separating the flow from the rest of the network and possibly enabling the existence of multiple concurrent flows.

According to the present embodiment of the invention, any network node can be in one of five states with respect to a given buffered unicast flow:

(a) Source node (S): it is the node originating a request for a route to a given destination (b) Destination node (D): the destination node is the intended recipient of the data from the source and does not relay received data.

(c) Relay node (R): the Relay nodes in the present disclosure relay packets as per the barrage-relay principle at a proper time slot after they are received for the very first time (and are otherwise ignored).

(d) Buffer nodes (B): Buffer nodes in the present disclosure serve to contain the flow. Buffer nodes do not relay any received packets (whether from inside or outside the flow).

(e) Uninvolved nodes (U): Any node outside a buffered unicast flow is uninvolved and can, therefore, participate in a different concurrent flow.

Figure 1:
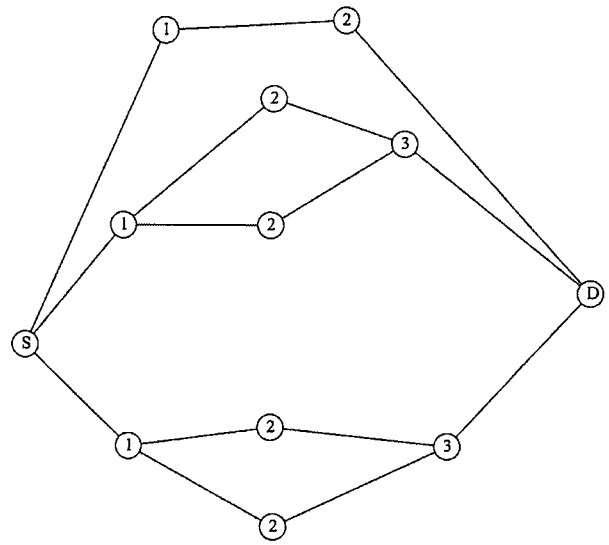
FIG. 1 illustrates a cooperative route between a source node (S) and a destination node (D) as a collection of distinct cooperative paths, in accordance with an embodiment of the present invention.
Figure 2A:
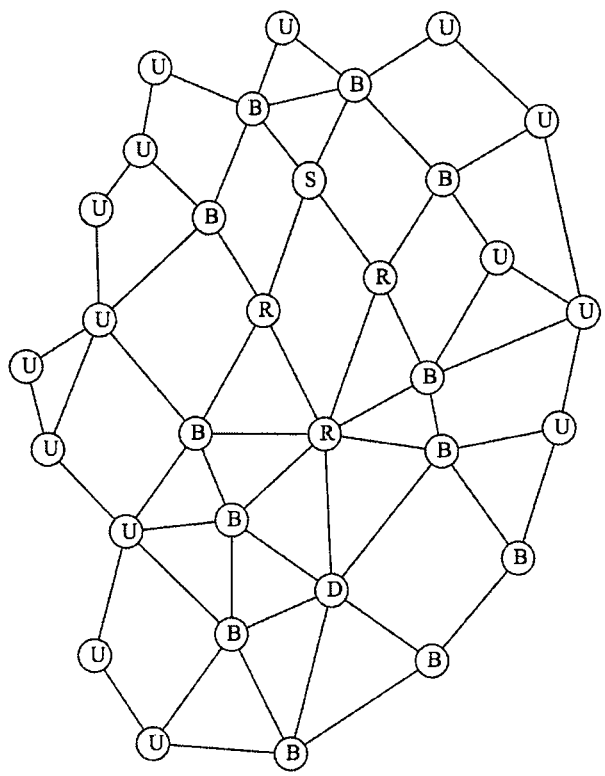
FIG. 2(a) illustrates a multi-node network with a source (S), a destination (D), relay nodes (R), buffer nodes (B) and uninvolved nodes (U), for a setting of N=0, in accordance with an embodiment of the present invention.
Figure 2B:
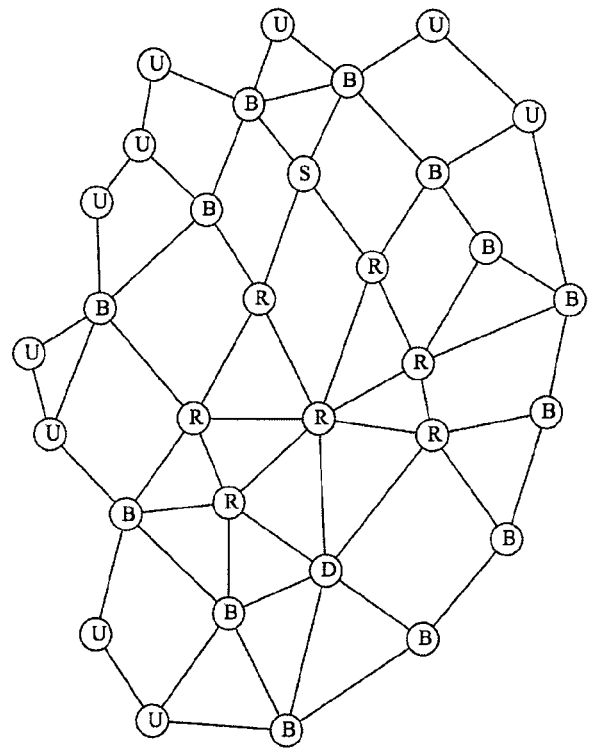
FIG. 2(b) illustrates a multi-node network with a source (S), a destination (D), relay nodes (R), buffer nodes (B) and uninvolved nodes (U), for a setting of N=1, in accordance with an embodiment of the present invention.
Figure 2C:
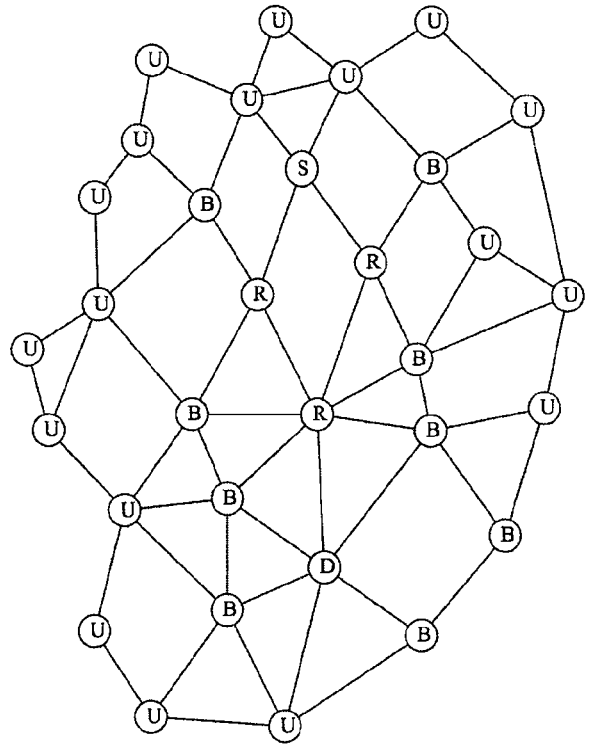
FIG. 2(c) illustrate a multi-node network with a source (S), a destination (D), relay nodes (R), buffer nodes (B) and uninvolved nodes (U), for a setting of N=1, in accordance with an embodiment of the present invention.

The role of the buffered unicast route establishment protocol is simply to assign each node in the network to a given state as described above (with respect to a specific flow). FIGS. 2a, 2b and 2c depict such assignments in sample networks after applying the protocol described below. FIG. 2(a) illustrates a multi-node network with a source (S), a destination (D), relay nodes (R), buffer nodes (B) and uninvolved nodes (U), for a setting of N=0. FIG. 2(b) illustrates a multi-node network with a source (S), a destination (D), relay nodes (R), buffer nodes (B) and uninvolved nodes (U), for a setting of N=1. FIG. 2(c) illustrate a multi-node network with a source (S), a destination (D), relay nodes (R), buffer nodes (B) and uninvolved nodes (U), for a setting of N=1.

Here, the protocol utilizes up to three types of packets (packets) in order to achieve this assignment:

(a) Request-For-Route (RFR) packet which contains four fields: (a.1) a unique Identifier (ID) for the source node, (a.2) an ID for the destination node, (a.3) the desired route width parameter, N, and (a.4) an RFR hop counter (RFR_Hops) that counts the number of hops from the source.

(b) Clear-To-Route (CTR) packet which contains five fields: (b.1) source ID, (b.2) destination ID, (b.3) route width parameter, N, (b.4) a CTR hop counter (CTR_Hops) that counts the number of hops from the destination, and (b.5) the total number of hops (Total RFR Relay Number) from the source to the destination.

(c) Buffer (BUF) packet: A BUF packet contains two fields: (c.1) source ID, and (c.2) destination ID.

In another embodiment of the invention, the protocol utilizes the RFR and the CTR packets described above but not the BUF packet. The buffer nodes B are inferred directly from the two aforementioned packets and the information they contain once they get relayed.

According to an embodiment of the invention, the route width parameter N is a non-negative integer included with the RFR and/or CTR packets to enable the inclusion of relay nodes that are not on a shortest path (minimum number of hops needed) between the source and destination. Specifically, nodes on paths that are no more than N hops longer than the shortest path are included as relay nodes in the cooperative route between source and destination.

According to a further embodiment of the invention, the route width parameter N is known by all nodes in the network prior to transmission of RFR and CTR packets (in other words, it is set prior to network deployment).

The buffered unicast route establishment protocol of the present embodiment proceeds as follows: the source node broadcasts an RFR packet with RFR_Hops=1 plus the source ID, destination ID, and route width fields set appropriately.

Upon receiving an RFR packet (for the first time only), a node stores the received number RFR_Hops as Stored_RFR_Hops and then relays an RFR packet with an incremented (by one) RFR hop count.

Upon receiving an RFR packet (for the first time only), the desired destination node stores the received RFR_Hops value as Total_RFR_Relay_Number and then transmits a CTR packet, which contains the number CTR_Hops set to one, the above-mentioned Total_RFR_Relay_Number, the source ID, the destination ID, and route width parameter fields set as in the received RFR packet.

Upon receiving a CTR packet (for the first time only), a node stores the two numbers: the contained Total_RFR_Relay_Number and the CTR_Hops number which it stores as Stored_CTR_Hops. It then checks to see if it has received a corresponding RFR packet with the same {source, destination} pair ID's.

If the node has not received the corresponding RFR packet with the same {source, destination} pair ID's at some previous time, it takes no further action.

If the node has received the corresponding RFR packet with the same {source, destination} pair ID's at some previous time, it recalls from memory the Stored_RFR_Hops number, the Stored_CTR_Hops number, the Total_RFR_Relay_Number and the route width parameter N, all corresponding to the same {source, destination} pair ID's.

Based on the above-mentioned numbers, the node performs a logic operation to determine whether it is on the collective route for this particular {source, destination} pair. The current disclosure will provide below a specific instantiation of this logic as an example. However, any other logic operation that arrives at the same conclusion, namely whether a node is or is not or the collective route for an given {source, destination} pair, is covered by the disclosure.

As an example of a logic operation mentioned above, the node may perform the following comparison:
If
Stored_RFR_Hops+
Stored_CTR_Hops≤Total_RFR_Relay_Number+N
then this node is on the collective route path for the said pair. If the above inequality is not satisfied, then this node is not on the collective route path for the said pair but, instead, acts as a buffer node and does not relay the CTR packet further.

If, as per the above inequality, the node decides that it is on the collective route path for the said pair, then the node relays the CTR packet with the CTR_Hops number incremented by one.

Upon receiving a CTR packet, the source node commences sending the message data along the established collective route to the destination.

In another embodiment of the disclosure, upon receiving a CTR packet, the source node waits a pre-specified time interval before it commences sending the message data along the established collective route to the destination.

In another embodiment of the disclosure, upon receiving a RFR packet, the destination node waits a pre-specified time interval (different, in general, from the waiting period of the source mentioned above) before it transmits the CTR packet.

In another embodiment of the disclosure, upon receiving an RFR packet (for the first time only), the desired destination node stores the received RFR_Hops value as Total_RFR_Relay_Number and then transmits a CTR packet, as described above, plus another buffer packet BUF as described in paragraph [0034 (c)]. The BUF packet is sent an appropriate time after the RFR packet has been received. Any node that receives the BUF packet only also becomes a buffer node. When the source receives a CTR packet, it waits for a proper period and then broadcasts a BUF packet as described above.

Note that the RFR messages that are part of the presently disclosed buffered unicast route establishment protocol flood the network. These RFR messages will propagate quickly through the network and, therefore, not contribute significantly to network overhead. On the other hand, the CTR messages are confined to the resulting collective route only.

FIGS. 2(a) and 2(b) illustrate the buffered unicast route established between a given source (S) and a destination node (D) for routes with N=0 and N=1, respectively. Relay, buffer, and uninvolved nodes are all appropriately marked. Note that when the route width parameter is increased from N=0 to N=1, the number of relay nodes increases. The addition of such nodes can improve robustness to node mobility or link failure. The highest value of N that the network can utilize depends on other factors, such as the time-slot reuse pattern.

FIG. 2(c) demonstrates the impact of transmitting BUF packets at the source and destination. Specifically, it illustrates the route that results when N=0 and BUF packet transmission is not included in the protocol. In this case, there are nodes adjacent to the source that are not adjacent to any relay nodes and, therefore, do not receive a CTR packet. The lowest node of the network adjacent to the destination in FIG. 2(c) fails to receive a CTR packet due to a collision between the CTR packet transmitted by the source and a delayed RFR packet transmitted by one of its neighbors and thus acts as uninvolved as opposed to buffer node.

What is claimed is:

1. A method for establishing a barrage relayed communication between a source node and a destination node via a plurality of intermediate nodes, the method comprising:
broadcasting a request message from the source node, wherein the request message comprises a first hop counter; thereafter
receiving the request message at each of a first subset of the plurality of intermediate nodes;
incrementing the first hop counter at each of the first subset of the plurality of intermediate nodes;
broadcasting the request message from the each of the first subset of the plurality of intermediate nodes; thereafter
receiving at least one instance of the request message at each of a second subset of the plurality of intermediate nodes;
incrementing the first hop counter at each of the second subset of the plurality of intermediate nodes;
broadcasting the request message from each of the second subset of the plurality of intermediate nodes; thereafter
receiving at least one instance of the request message at the destination node; thereafter
broadcasting an acceptance message from the destination node, wherein the acceptance message comprises a second hop counter; thereafter
receiving the acceptance message at each of a third subset of the plurality of intermediate nodes;
performing a logical operation at each of the third subset of the plurality of intermediate nodes based on the first hop counter and the second hop counter;
incrementing the second hop counter at each of a fourth subset of the plurality of intermediate nodes, the fourth subset of the plurality of intermediate nodes being that portion of the third subset of the plurality of intermediate nodes for which the logical operation is satisfied;
broadcasting the acceptance message from the each of the fourth subset of the plurality of intermediate nodes; thereafter
receiving at least one instance of the acceptance message at each of a fifth subset of the plurality of intermediate nodes;
performing the logical operation at each of the fifth subset of the plurality of intermediate nodes based on the first hop counter and the second hop counter;
incrementing the second hop counter at each of a sixth subset of the plurality of intermediate nodes, the sixth subset of the plurality of intermediate nodes being that portion of the fifth subset of the plurality of intermediate nodes for which the logical operation is satisfied;
broadcasting the acceptance message from the each of the sixth subset of the plurality of intermediate nodes; thereafter
receiving at least one instance of the acceptance message at the source node; thereafter
transmitting a data message between the source node and the destination node via the fourth and sixth subsets of the plurality of intermediate nodes, wherein each of the fourth and sixth subsets of the plurality of intermediate nodes participates in relaying the data message.

2. The method of claim 1, wherein receiving at least one instance of the request message at each of a second subset of the plurality of intermediate nodes comprises:
receiving the at least one instance of the request message at each of one or more subsets of the plurality of intermediate nodes, incrementing the first hop counter at each of the one or more subsets of the plurality of intermediate nodes, and broadcasting the request message from each of the one or more subsets of the plurality of intermediate nodes;

wherein receiving at least one instance of the acceptance message at each of a fifth subset of the plurality of intermediate nodes comprises:

receiving the acceptance message at each of the one or more subsets of the plurality of intermediate nodes, performing the logical operation at each of the one or more subsets of the plurality of intermediate nodes based on the first hop counter and the second hop counter, incrementing the second hop counter at each of a subset of the one or more subsets of the plurality of intermediate nodes, the subset being that portion of the one or more subsets of the plurality of intermediate nodes for which the logical operation is satisfied, and broadcasting the acceptance message from the each of the subset of the one or more subsets of the plurality of intermediate nodes.

3. The method of claim 1, wherein the at least one instance of the request message received at the destination node is free of identifying parameters associated with any of the first and second subsets of the plurality of intermediate nodes, and wherein the at least one instance of the acceptance message received at the source node is free of identifying parameters associated with any of the fourth and sixth subsets of the plurality of intermediate nodes.

4. The method of claim 1, wherein the request message and the acceptance message further comprise a route width parameter N that is a non-negative integer.

5. The method of claim 4, wherein the acceptance message further comprises a total hop count.

6. The method of claim 5, wherein increasing the route width parameter N increases a number of nodes of the plurality of intermediate nodes in the fourth and sixth subsets of the plurality of intermediate nodes.

7. The method of claim 5, wherein the logical operation comprises comparing a first sum of the first hop counter and the second hop counter to a second sum of the total hop count and the route width parameter N.

8. The method of claim 7, wherein the first sum does not exceed the second sum for each of the fourth and sixth subsets of the plurality of intermediate nodes that participate in the relaying of the data message between the source node and the destination node.

9. The method of claim 4, wherein the route width parameter N is known by each of the plurality of intermediate nodes prior to the broadcasting of either the request message or the acceptance message.

10. The method of claim 1, wherein the portion of the third and fifth subsets of the plurality of intermediate nodes for which the logical operation is not satisfied comprise buffer nodes.

11. A system for establishing a barrage relayed communication in a network of nodes, the system comprising:
a source node;
a destination node; and
a plurality of intermediate nodes,
wherein the source node is capable of broadcasting a request message that comprises a first hop counter,
wherein a first subset of the plurality of intermediate nodes is capable of receiving the request message, incrementing the first hop counter, and broadcasting the request message,
wherein a second subset of the plurality of intermediate nodes is capable of receiving at least one instance of the request message, incrementing the first hop counter, and broadcasting the request message, wherein the destination node is capable of receiving the at least one instance of the request message and broadcasting an acceptance message that comprises a second hop counter in response to receiving the at least one instance of the request message, wherein a third subset of the plurality of intermediate nodes is capable of receiving the acceptance message and performing a logical operation based on the first hop counter and the second hop counter, wherein a fourth subset of the plurality of intermediate nodes is capable of incrementing the second hop counter and broadcasting the acceptance message, the fourth subset of the plurality of intermediate nodes being that portion of the third subset of the plurality of intermediate nodes for which the logical operation is satisfied, wherein a fifth subset of the plurality of intermediate nodes is capable of receiving at least one instance of the acceptance message and performing a logical operation based on the first hop counter and the second hop counter, wherein a sixth subset of the plurality of intermediate nodes is capable of incrementing the second hop counter and broadcasting the acceptance message, the sixth subset of the plurality of intermediate nodes being that portion of the fifth subset of the plurality of intermediate nodes for which the logical operation is satisfied, wherein the source node is further capable of receiving the at least one instance of the acceptance message and transmitting a data message between the source node and the destination node via the fourth and sixth subsets of the plurality of intermediate nodes after the at least one instance of the acceptance message is received, and wherein each of the fourth and sixth subsets of the plurality of intermediate nodes participates in relaying the data message.

12. The system of claim 11, wherein the at least one instance of the request message received at the destination node is free of identifying parameters associated with any of the first and second subsets of the plurality of intermediate nodes, and wherein the at least one instance of the acceptance message received at the source node is free of identifying parameters associated with any of the fourth and sixth subsets of the plurality of intermediate nodes.

13. The system of claim 11, wherein the request message and the acceptance message further comprise a route width parameter N that is a non-negative integer.

14. The system of claim 13, wherein the acceptance message further comprises a total hop count.

15. The system of claim 14, wherein the logical operation comprises comparing a first sum of the first hop counter and the second hop counter to a second sum of the total hop count and the route width parameter N.

16. The system of claim 15, wherein the first sum does not exceed the second sum for each of the fourth and sixth subsets of the plurality of intermediate nodes that participate in the relaying of the data message between the source node and the destination node.

17. The system of claim 13, wherein increasing the route width parameter N increases a number of the plurality of intermediate nodes in the fourth and sixth subsets of the plurality of intermediate nodes.

18. The system of claim 13, wherein the route width parameter N is known by each of the plurality of intermediate nodes prior to the broadcasting of either the request message or the acceptance message.

19. The system of claim 11, wherein the request message, the acceptance message, and the data message comprise an identifier for the source node and an identifier for the destination node.

20. A system for establishing a barrage relayed communication in a network of nodes, the system comprising:
- a source node;
- a destination node; and
- a plurality of intermediate nodes,
- wherein the source node is capable of broadcasting a request message that comprises a first hop counter,
- wherein a first subset of the plurality of intermediate nodes is capable of receiving the request message, incrementing the first hop counter, and broadcasting the request message,
- wherein the destination node is capable of receiving at least one instance of the request message and broadcasting an acceptance message that comprises a second hop counter in response to receiving the at least one instance of the request message,
- wherein a second subset of the plurality of intermediate nodes is capable of receiving the acceptance message and performing a logical operation based on the first hop counter and the second hop counter,
- wherein a third subset of the plurality of intermediate nodes is capable of incrementing the second hop counter and broadcasting the acceptance message, the third subset of the plurality of intermediate nodes being that portion of the second subset of the plurality of intermediate nodes for which the logical operation is satisfied,
- wherein the source node is further capable of receiving the at least one instance of the acceptance message and transmitting a data message between the source node and the destination node via the third subset of the plurality of intermediate nodes after the at least one instance of the acceptance message is received, and wherein each of the third subset of the plurality of intermediate nodes participates in relaying the data message.

* * * * *